US012692819B2

(12) United States Patent
Sasaki

(10) Patent No.: US 12,692,819 B2
(45) Date of Patent: Jul. 28, 2026

(54) FILTER REGENERATION CONTROL DEVICE FOR VEHICLE

(71) Applicant: TOYOTA JIDOSHA KABUSHIKI KAISHA, Toyota (JP)

(72) Inventor: Katsuya Sasaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/187,169

(22) Filed: Apr. 23, 2025

(65) Prior Publication Data

US 2026/0078709 A1 Mar. 19, 2026

(30) Foreign Application Priority Data

Sep. 19, 2024 (JP) ................................ 2024-161925

(51) Int. Cl.
*F02D 41/02* (2006.01)

(52) U.S. Cl.
CPC ....... *F02D 41/0245* (2013.01); *F02D 41/027* (2013.01); *F02D 2200/0812* (2013.01); *F02D 2200/702* (2013.01)

(58) Field of Classification Search
CPC .. F02D 41/024; F02D 41/0245; F02D 41/027; F02D 41/0275; F02D 41/028; F02D 41/0285; F02D 41/029; F02D 2041/026
USPC .................................................... 60/272–324
See application file for complete search history.

(56) References Cited

U.S. PATENT DOCUMENTS

| | | | | |
|---|---|---|---|---|
| 10,273,845 | B2 * | 4/2019 | Saxman | F01N 1/168 |
| 10,400,691 | B2 * | 9/2019 | Serrano | F02D 41/107 |
| 2009/0319160 | A1 * | 12/2009 | Callahan | F02D 9/04 701/111 |

FOREIGN PATENT DOCUMENTS

| | | |
|---|---|---|
| JP | 2021-126940 A | 9/2021 |

* cited by examiner

*Primary Examiner* — Erick R Solis
(74) *Attorney, Agent, or Firm* — SoraIP, Inc.

(57) ABSTRACT

A filter regeneration control device for a vehicle is configured to restore a collecting capability of a filter that collects particulate matter contained in an exhaust gas of an engine. The filter regeneration control device is configured to execute filter regeneration control including a warm-up operation of increasing an exhaust gas temperature of the engine to increase a temperature of the filter and a regeneration operation of supplying the filter with oxygen through the engine in a case where an amount of the particulate matter deposited in the filter is equal to or greater than a predetermined amount and a sound pressure level in a vehicle cabin is equal to or higher than a predetermined level.

6 Claims, 5 Drawing Sheets

FILTER REGENERATION CONTROL DEVICE FOR VEHICLE

CROSS-REFERENCE TO RELATED APPLICATION

This application claims priority to Japanese Patent Application No. 2024-161925 filed on Sep. 19, 2024. The disclosure of the above-identified application, including the specification, drawings, and claims, is incorporated by reference herein in its entirety.

BACKGROUND

1. Technical Field

The present disclosure relates to a filter regeneration control device that is configured to restore a collection performance of a filter for cleaning exhaust gas of an engine.

2. Description of Related Art

Japanese Unexamined Patent Application Publication No. 2021-126940 (JP 2021-126940 A) discloses a control device that regenerates a filter for collecting particulate matter contained in exhaust gas of an engine in a hybrid electric vehicle. The hybrid electric vehicle includes an engine and two motors as a drive power source, and is configured so that in a state in which the engine and one of the motors are disconnected from drive wheels, the other motor can be used for EV traveling. The regeneration control device described in JP 2021-126940 A executes filter regeneration control of supplying oxygen to the filter in a warmed state and burning particulate matter deposited on the filter. The control is executed by motoring the engine by one motor during EV traveling. In the regeneration control described in JP 2021-126940 A, when the regeneration control is executed in a non-noise area such as a residential area, the motoring rotation speed in the regeneration control is set lower than when the regeneration control is executed in a noisy area such as an industrial area or an urban area during the day. This is to suppress noise associated with an increase in engine rotation speed. In addition, the regeneration control described in JP 2021-126940 A regenerates the filter by motoring the engine with the one of the motors. Therefore, when a power source that supplies power to the motor is predicted to have a remaining charge equal to or more than a predetermined value at the point in time when the regeneration control of the filter is completed, the filter regeneration control is executed.

SUMMARY

The filter regeneration control described in JP 2021-126940 A sets the motoring rotation speed in the filter regeneration control according to a traveling environment of the vehicle. Therefore, in a case where the filter regeneration control is executed in a noisy area, the motoring rotation speed is set to a relatively high rotation speed, and the engine rotates at a relatively high rotation speed, so that a relatively loud noise is generated in a vehicle cabin. Therefore, a driver or an occupant may feel discomfort or unpleasantness.

The disclosure has been made in view of the above technical problem, and an object of the disclosure is to provide a filter regeneration control device for a vehicle capable of suppressing a sense of discomfort or unpleasantness felt by a driver or an occupant when filter regeneration control is executed.

In order to achieve the above-mentioned object, the disclosure provides a filter regeneration control device for a vehicle that is configured to restore a collecting capability of a filter that collects particulate matter contained in an exhaust gas of an engine.

The filter regeneration control device includes a controller that controls the engine.

The controller includes a deposition amount determination unit, a traveling condition determination unit, and a regeneration control execution unit.

The deposition amount determination unit is configured to determine whether a deposition amount of the particulate matter in the filter is equal to or greater than a predetermined amount.

The traveling condition determination unit is configured to determine, in a case where the deposition amount determination unit determines that the deposition amount of the particulate matter is equal to or greater than the predetermined amount, that a traveling condition exists in which a sound pressure level in a vehicle cabin is equal to or higher than a predetermined level.

The regeneration control execution unit is configured to execute, in a case where the traveling condition exits in which the sound pressure level is equal to or higher than the predetermined level, filter regeneration control including a warm-up operation of increasing an exhaust temperature of the engine to increase a temperature of the filter and a regeneration operation of supplying oxygen to the filter through the engine.

In the disclosure, a measurer configured to measure the sound pressure level in the vehicle cabin may be further included.

The traveling condition may include a traveling condition in which the sound pressure level in the vehicle cabin measured by the measurer is equal to or higher than the predetermined level.

In addition, in the disclosure, the traveling condition may include a traveling condition in which the sound pressure level in the vehicle cabin is estimated to be equal to or higher than the predetermined level.

In addition, in the disclosure, a sound generator configured to emit a sound toward the vehicle cabin may be further included.

The traveling condition may include a traveling condition in which the sound pressure level in the vehicle cabin is equal to or higher than the predetermined level in a case where a signal input to the sound generator is equal to or greater than a predetermined value.

In the disclosure, a position specifier configured to specify position information of the vehicle, and a road surface information storage unit configured to store road surface information of a traveling road of the vehicle may be further included.

The regeneration control execution unit may be configured to execute the filter regeneration control in a case where the vehicle travels on a road surface on which the sound pressure level in the vehicle cabin is estimated to be equal to or higher than the predetermined level for a predetermined time or longer, based on the position information specified by the position specifier and the road surface information stored in the road surface information storage unit.

In the disclosure, the controller may further include a storage unit configured to store a traveling history of the vehicle, a calculation unit configured to calculate a controllable ratio that is a ratio of a period during which the sound pressure level in the vehicle cabin is equal to or higher than the predetermined level, to a traveling distance of the vehicle or a traveling time of the vehicle, based on the traveling history stored in the storage unit, and a correction unit configured to correct the predetermined amount to a smaller amount as the controllable ratio calculated by the calculation unit becomes smaller.

According to the disclosure, in a case where the traveling condition exists in which the sound pressure level in the vehicle cabin is equal to or higher than the predetermined level, the filter regeneration control is executed, and thus the sound generated by the execution of the filter regeneration control is masked by other sounds generated in the vehicle cabin. Therefore, it is possible to suppress a sense of discomfort or unpleasantness, such as a feeling that a sound generated from the vehicle has changed, felt by a driver or an occupant.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
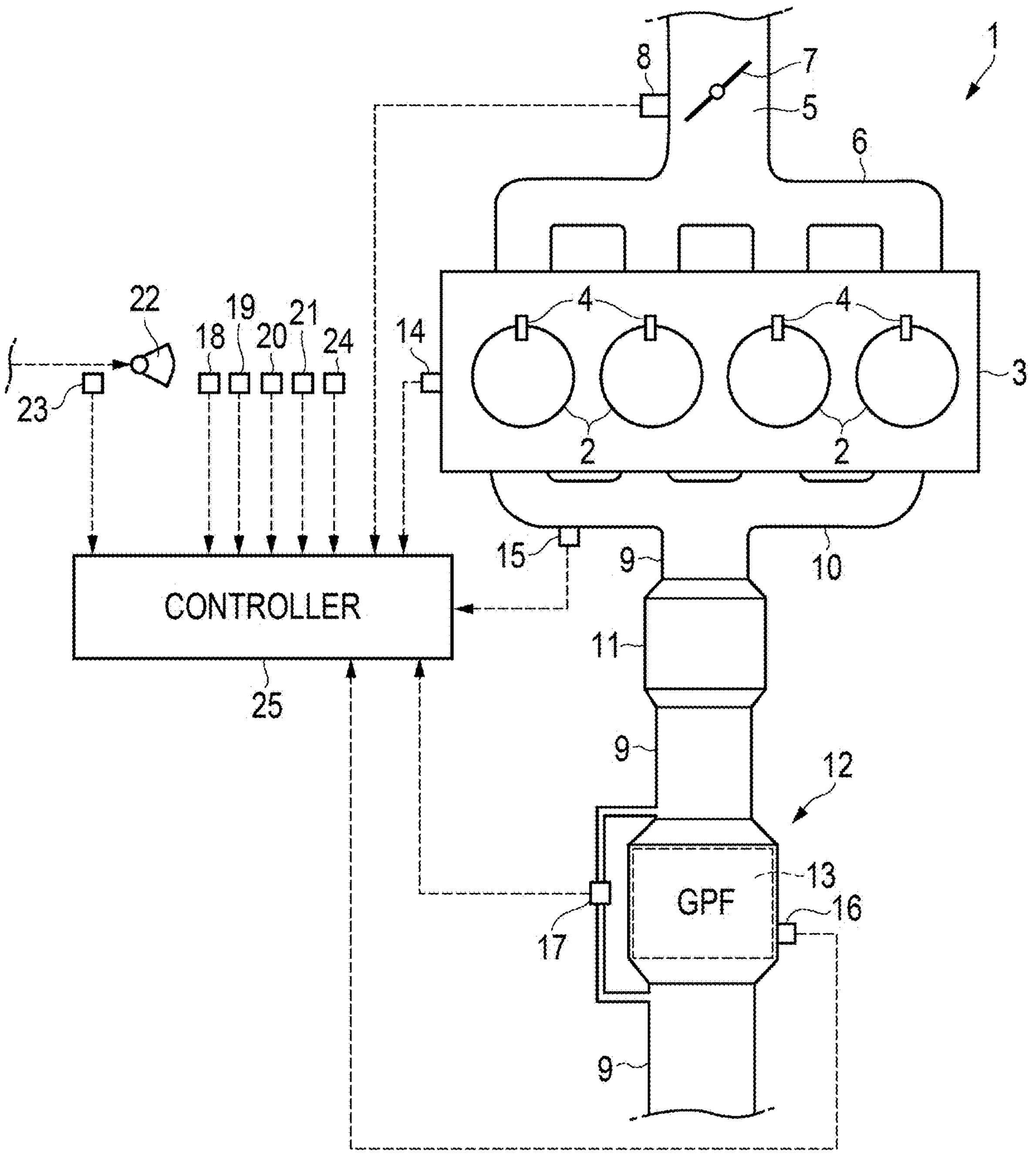
FIG. 1 is a diagram for describing an example of a vehicle including an engine and a filter in an embodiment of the disclosure.

The present disclosure will be described based on the embodiment shown in the drawings. The embodiments described below are merely examples of the present disclosure and do not limit the present disclosure.

FIG. 1 schematically shows an example of a vehicle Ve including an engine and a filter according to an embodiment of the disclosure. The engine 1 shown in FIG. 1 is configured to generate power by burning an air-fuel mixture of fuel such as gasoline or diesel and air, as in a conventional engine. Specifically, the engine 1 includes an engine block 3 in which a plurality of cylinders 2 for burning an air-fuel mixture is provided. An ignition plug 4 for igniting the air-fuel mixture is provided in each cylinder 2.

An intake pipe 5 for taking in outside air is connected to the engine block 3 via an intake manifold 6. In the intake pipe 5, in addition to various members such as an air cleaner (not shown), a throttle valve 7 for controlling an amount of air flowing in the intake pipe 5 based on an accelerator operation amount of a driver is provided. A throttle opening degree sensor 8 for detecting an opening degree of the throttle valve 7 is provided in the intake pipe 5.

An exhaust pipe 9 for discharging exhaust gas generated by burning an air-fuel mixture in each of the cylinders 2 to the outside of the vehicle is connected to the engine block 3 through an exhaust manifold 10.

Various devices are provided in the exhaust pipe 9 to purify unburned gas (carbon monoxide (CO) and hydrocarbon (HC)) and nitrogen oxide (NOx) contained in the exhaust gas, and to collect particulate matter (PM). In the example shown in FIG. 1, a catalyst device 11, such as an oxidation catalyst (binary catalyst) or a ternary catalyst for removing unburned gas or NOx is provided in the exhaust pipe 9, and a PM collection device 12 for collecting particulate matter is provided downstream of the catalyst device 11. The PM collection device 12 corresponds to a "filter" in the embodiment of the present disclosure.

The PM collection device 12 functions as an exhaust gas control device. For example, the filter 13 is a filter constructed from a wall flow type filter 13 referred to as a gasoline particulate filter (GPF). The filter 13 can be configured in the same manner as a conventional GPF, and a plurality of pores that capture particulate matter contained in the exhaust gas in a process of the exhaust gas passing through the filter 13 are provided. In addition to the function of collecting the particulate matter, the filter 13 has a function as a catalytic converter that oxidizes and reduces nitrogen oxides, carbon monoxide, or hydrocarbons contained in the exhaust gas to clean the nitrogen oxides, carbon monoxide, or hydrocarbons. Specifically, the wall surface of the pores is coated with platinum, palladium, rhodium, or the like. In the following description, the filter 13 is referred to as a GPF 13.

In addition, the vehicle Ve is provided with a crank angle sensor 14 that detects the rotation speed (or rotation angle) of the engine 1, an A/F sensor 15 that detects the oxygen concentration contained in the exhaust gas, and a floor temperature sensor 16 that detects the temperature of the GPF 13. Further, the vehicle Ve is provided with a differential pressure sensor 17 that detects a differential pressure between the upstream side and the downstream side of the GPF 13, a vehicle speed sensor 18 that detects a vehicle speed, a microphone 19 that detects a sound pressure in a vehicle cabin, and a G sensor 20 that detects an acceleration of the vehicle Ve. The microphone 19 corresponds to a "measurer" in the embodiment of the disclosure.

Further, the vehicle Ve is provided with a navigation system 21 in which map information including road surface information of the traveling road is stored, and a speaker 22 that generates sound in the vehicle cabin. The vehicle Ve is provided with an input value detection sensor 23 that detects a signal (for example, a current value) input to the speaker 22 from another controller, a GPS receiver 24 that specifies position information of the vehicle Ve, and the like. The navigation system 21 corresponds to the "road surface information storage unit" in the embodiment of the disclosure, the speaker 22 corresponds to the "sound generator" in the embodiment of the disclosure, and the GPS receiver 24 corresponds to the "position specifier" in the embodiment of the disclosure.

A controller 25 that controls the engine 1 is provided based on the signal detected by the various sensors described above. The controller 25 is configured to be similar to a controller provided in a general vehicle, and is configured to output a signal for controlling the engine 1 based on a signal input and a map, an equation, or the like stored in advance. Specifically, the controller 25 requests the amount of fuel injected into the engine 1, the amount of air supplied to the engine 1, the timing of ignition of the air-fuel mixture of the air and the fuel, or the like (not shown), and outputs a command signal to the injector, the throttle valve 7, or the ignition plug 4.

Figure 2:
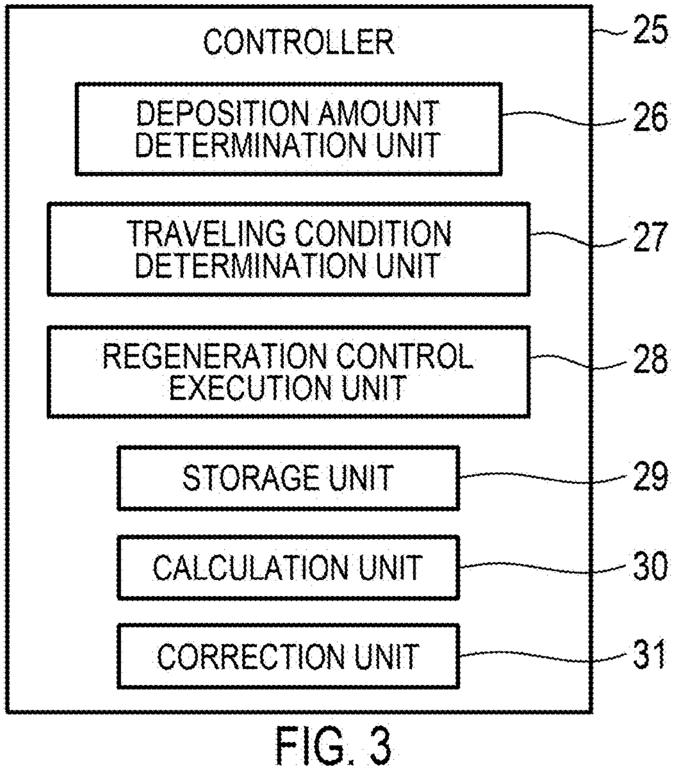
FIG. 2 is a block diagram illustrating a functional configuration of a controller in the embodiment of the disclosure.

FIG. 2 is a block diagram illustrating a functional configuration of the controller 25. The controller 25 shown in FIG. 2 includes a deposition amount determination unit 26, a traveling condition determination unit 27, a regeneration control execution unit 28, a storage unit 29, a calculation unit 30, and a correction unit 31.

The deposition amount determination unit 26 determines whether a predetermined amount or more of the particulate matter is deposited in the GPF 13. Specifically, a signal is input from the differential pressure sensor 17. Then, the determination is made as to whether the amount of the particulate matter deposited in the GPF 13 is equal to or greater than a predetermined amount based on whether the difference between the pressure on the input side and the pressure on the output side of the GPF 13 based on the input signal is greater than a predetermined difference. Alternatively, the amount of the particulate matter to be deposited in the GPF 13 is accumulated based on the operation state of the engine 1, such as the rotation speed of the engine 1 detected by the crank angle sensor 14 or the oxygen concentration contained in the exhaust gas detected by the A/F sensor 15. Then, the determination is made whether the particulate matter having the predetermined amount or more is deposited in the GPF 13 based on whether the cumulative value is equal to or greater than a predetermined value determined in advance.

The traveling condition determination unit 27 determines whether the traveling condition exists in which the sound pressure level in the vehicle cabin is equal to or higher than a predetermined level. The traveling condition determination unit 27 may measure the sound pressure level in the vehicle cabin by the microphone 19 and determine whether the traveling condition exists in which the sound pressure level in the vehicle cabin is equal to or higher than a predetermined level. The traveling condition determination unit 27 may determine whether the traveling condition exists in which the sound pressure level in the vehicle cabin estimated based on the traveling state or the traveling environment of the vehicle Ve is equal to or higher than a predetermined level.

Specifically, when the vehicle speed detected by the vehicle speed sensor 18 is equal to or higher than a predetermined vehicle speed, it may be determined that the traveling condition exists in which the sound pressure level in the vehicle cabin is equal to or higher than a predetermined level. This is because, when the vehicle Ve travels, a traveling sound, such as a friction sound between wheels and a road surface, a drive sound of a drive power source, such as the engine 1, or a power transmission device including a gear train unit (not shown), and a wind sound are generated, and a sound corresponding to the traveling sound is generated in the vehicle cabin.

Alternatively, in a case where the vehicle Ve travels on a rough road surface, it may be determined that the traveling condition exists in which the sound pressure level in the vehicle cabin is equal to or higher than the predetermined level. Specifically, in a case where the acceleration detected by the G sensor 20 is equal to or higher than a predetermined acceleration, it may be determined that the traveling condition exists in which the sound pressure level in the vehicle cabin is equal to or higher than a predetermined level. In a case where the current position of the vehicle Ve detected by the GPS receiver 24 is on a rough road surface, such as a bumpy road, stored in map information of a navigation system or the like, it may be determined the traveling condition exists in which the sound pressure level in the vehicle cabin is equal to or higher than a predetermined level.

Further, the traveling condition determination unit 27 may determine that the traveling condition exists in which the sound pressure level of the sound in the vehicle cabin is equal to or higher than a predetermined level, in a case where the loudness (the sound pressure level) of the sound emitted toward the vehicle cabin is equal to or higher than a predetermined level. Specifically, when the command signal (detection value by the input value detection sensor 23) input to the speaker 22 is equal to or more than a predetermined value, the determination may be made that the traveling condition exists in which the sound pressure level in the vehicle cabin is equal to or higher than a predetermined level. The sound emitted from the speaker 22 may be a sound such as music output from an audio device (not shown) or may be a masking sound that simulates the traveling sound.

The regeneration control execution unit 28 outputs a command signal for executing filter regeneration control for oxidizing and removing the particulate matter deposited on the GPF 13 to restore the particulate matter collection capability of the GPF 13 to the engine 1. Specifically, the filter regeneration control is to execute the warm-up operation and the regeneration operation. The warm-up operation increases the exhaust temperature of the engine 1 by delaying the ignition timing of the engine 1 from the top dead center of compression (retarding the ignition timing) to increase the temperature of the GPF 13. In the regeneration operation, the supply of the fuel to the engine 1 is stopped, and the oxygen is supplied to the GPF 13 that is warmed through the engine 1. That is, when the detection temperature of the floor temperature sensor 16 is increased to the predetermined temperature by executing the warm-up operation, the supply of the fuel to the engine 1 is stopped and the operation is shifted to the regeneration operation.

The storage unit 29 stores a traveling history of the vehicle Ve. Specifically, at least the total traveling distance or the total traveling time and the period in which the traveling condition determination unit 27 determines that the sound pressure level in the vehicle cabin is equal to or higher than a predetermined level as a traveling condition are stored.

The calculation unit 30 calculates a controllable ratio of a period in which a traveling condition is determined in which the sound pressure level in the vehicle cabin is equal to or higher than a predetermined level, with respect to a total traveling distance or a total traveling time, based on the traveling history stored in the storage unit 29. That is, the calculation unit 30 estimates whether the owner of the vehicle Ve drives the vehicle in a situation where the sound pressure level in the vehicle cabin is high or is an owner who performs a driving operation for increasing the sound pressure level in the vehicle cabin. Alternatively, the calculation unit 30 estimates whether the owner of the vehicle Ve uses the vehicle Ve in an environment in which the sound pressure level in the vehicle cabin is increased.

The correction unit 31 corrects a predetermined amount adopted by the deposition amount determination unit 26 according to the controllable ratio calculated by the calculation unit 30. Specifically, the predetermined amount is corrected to a smaller value as the controllable ratio is smaller. The correction unit 31 may determine the rate at which the particulate matter is deposited in the GPF 13 based on the detection value of the differential pressure sensor 17 or the operation state of the engine 1, in addition to or instead of the controllable ratio, and correct the predetermined value to a smaller value as the deposition rate is faster.

Figure 3:
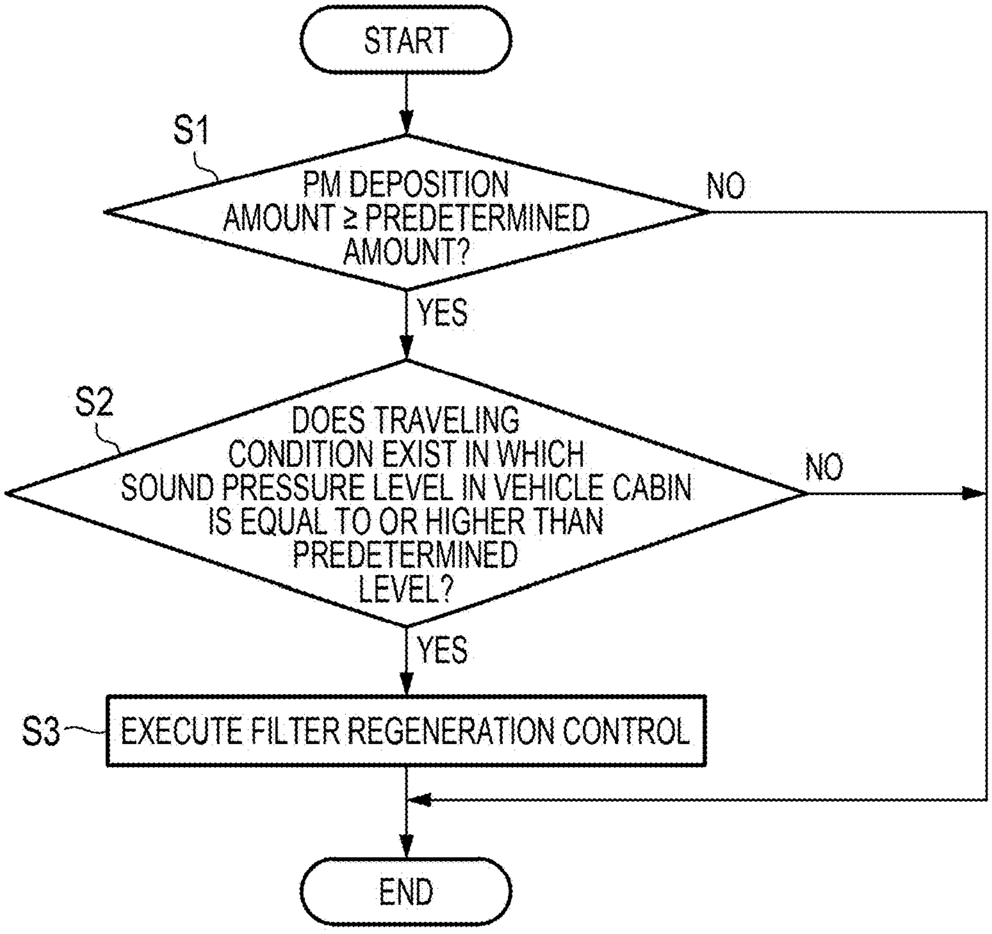
FIG. 3 is a flowchart for describing a control example executed by the filter regeneration control device according to the embodiment of the disclosure.

FIG. 3 is a flowchart for describing a control example for determining the presence or absence of execution of the filter regeneration control. In the control example shown in FIG. 3, first, determination is made as to whether the PM deposition amount is equal to or greater than a predetermined amount (S1). The S1 is executed by the deposition amount determination unit 26. That is, when the difference between the pressure on the input side and the pressure on the output side of the GPF 13 is equal to or greater than a predetermined difference, or when the cumulative value of the deposition amount of the particulate matter requested based on the operation state of the engine 1 is equal to or greater than a predetermined value, a positive determination is made in S1. The predetermined amount in S1 is a threshold value for determining that the filter regeneration control is executed, and is set to an amount smaller than the deposition amount in which the collection function of the GPF 13 for the particulate matter is significantly decreased.

When a negative determination is made in S1 that the PM deposition amount is less than the predetermined amount, the GPF 13 functions normally and can collect the particulate matter, so that the routine is terminated as it is. On the contrary, in a case where a positive determination is made in S1 that the PM deposition amount is equal to or greater than a predetermined amount, the determination is made whether the traveling condition exists in which the sound pressure level in the vehicle cabin is equal to or higher than the predetermined level (S2). The S2 is executed by a traveling condition determination unit 27. That is, when the sound pressure level in the vehicle cabin actually measured by the microphone 19 is equal to or higher than a predetermined level, or when the vehicle speed is equal to or higher than a predetermined vehicle speed, a positive determination is made in S2. In a case where the vehicle Ve travels on the rough road surface or in a case where the loudness of the sound emitted toward the vehicle cabin is equal to or higher than a predetermined level, a positive determination is made in S2. The predetermined level in S2 is set to a level equal to or higher than a level of a sound generated in a vehicle cabin by executing the filter regeneration control. That is, S2 determines whether the sound generated due to the execution of the filter regeneration control can be masked by the sound generated in the vehicle cabin.

When a negative determination is made in S2 that the traveling condition in which the sound pressure level in the vehicle cabin is equal to or higher than the predetermined level does not exist, the routine ends once without executing the filter regeneration control. This is because, in a case where a sound is generated due to the execution of the filter regeneration control, the driver or the occupant feels discomfort or unpleasantness. On the contrary, when the determination in S2 is made positively that the traveling condition exists in which the sound pressure level in the vehicle cabin is equal to or higher than the predetermined level, the filter regeneration control is executed (S3), and the routine is temporarily terminated.

Figure 4:
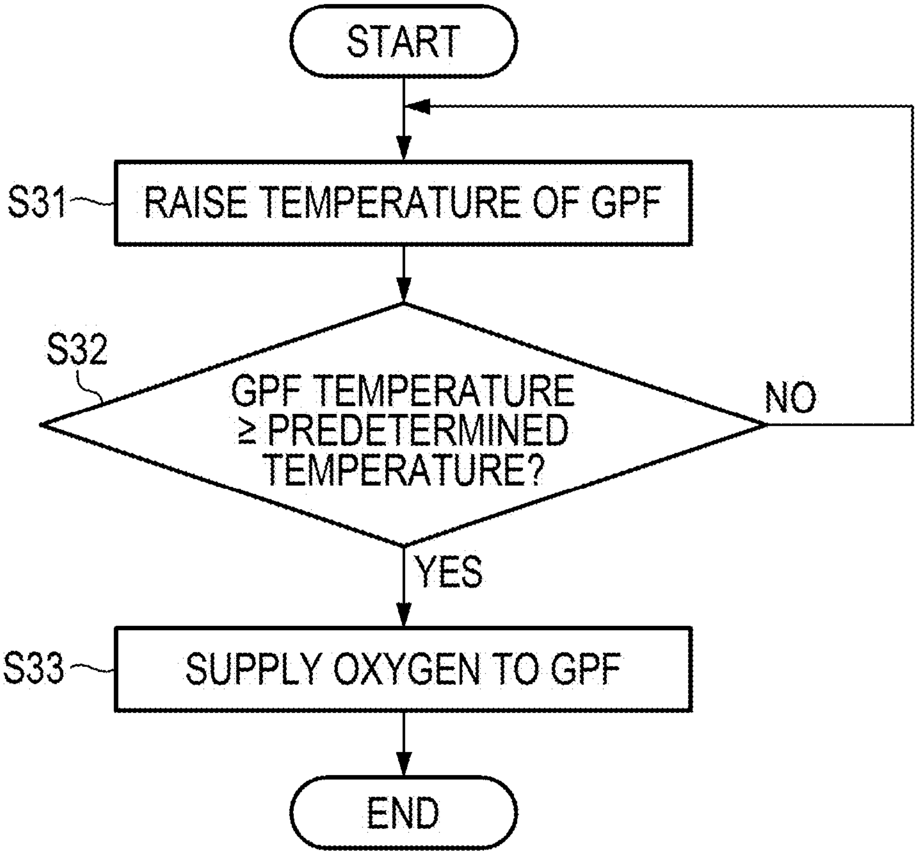
FIG. 4 is a flowchart for describing an example of the filter regeneration control.

FIG. 4 is a flowchart for describing an example of the filter regeneration control. In the example shown here, first, the temperature of the GPF 13 is increased (S31). Specifically, the exhaust temperature of the engine 1 is increased by retarding the ignition timing, so that the GPF 13 is heated by the exhaust of the engine 1. Note that S31 corresponds to the "warm-up operation" in the embodiment of the disclosure.

Next, it is determined whether the temperature of the GPF 13 is equal to or higher than a predetermined temperature (S32). The S32 is a step of determining whether the temperature of the deposited particulate matter reaches a temperature at which the deposited particulate matter can be oxidized and removed by supplying oxygen to the GPF 13, and can be determined based on the temperature detected by the floor temperature sensor 16. Therefore, in a case where a negative determination is made in S32 due to the fact that the temperature of the GPF 13 is lower than the predetermined temperature, the process returns to S31. That is, S31 and S32 are repeatedly executed until the temperature of the GPF 13 becomes equal to or higher than the predetermined temperature.

On the contrary, when the temperature of the GPF 13 is positively determined in S32 by being equal to or higher than the predetermined temperature, oxygen is supplied to the GPF 13 (S33). Specifically, the fuel cut for stopping the supply of fuel to the engine 1 is performed to cause the air to flow through the GPF 13 via the engine 1. Note that S33 is continuously executed until the difference between the pressure on the input side and the pressure on the output side of the GPF 13 is reduced to a level at which the determination can be made that the particulate matter deposited in the GPF 13 are removed, for example. Alternatively, S33 is continuously executed for a predetermined period of time during which the particulate matter deposited in the GPF 13 can be removed. Thereafter, the routine is temporarily terminated.

As described above, in a traveling condition in which the sound pressure level in the vehicle cabin is equal to or higher than a predetermined level, the filter regeneration control is executed, and thus the sound generated due to the execution of the filter regeneration control is masked by other sounds generated in the vehicle cabin. Therefore, it is possible to suppress a feeling of discomfort or unpleasantness, such as a feeling that the sound generated from the vehicle Ve has changed, of the driver or the occupant.

Figure 5:
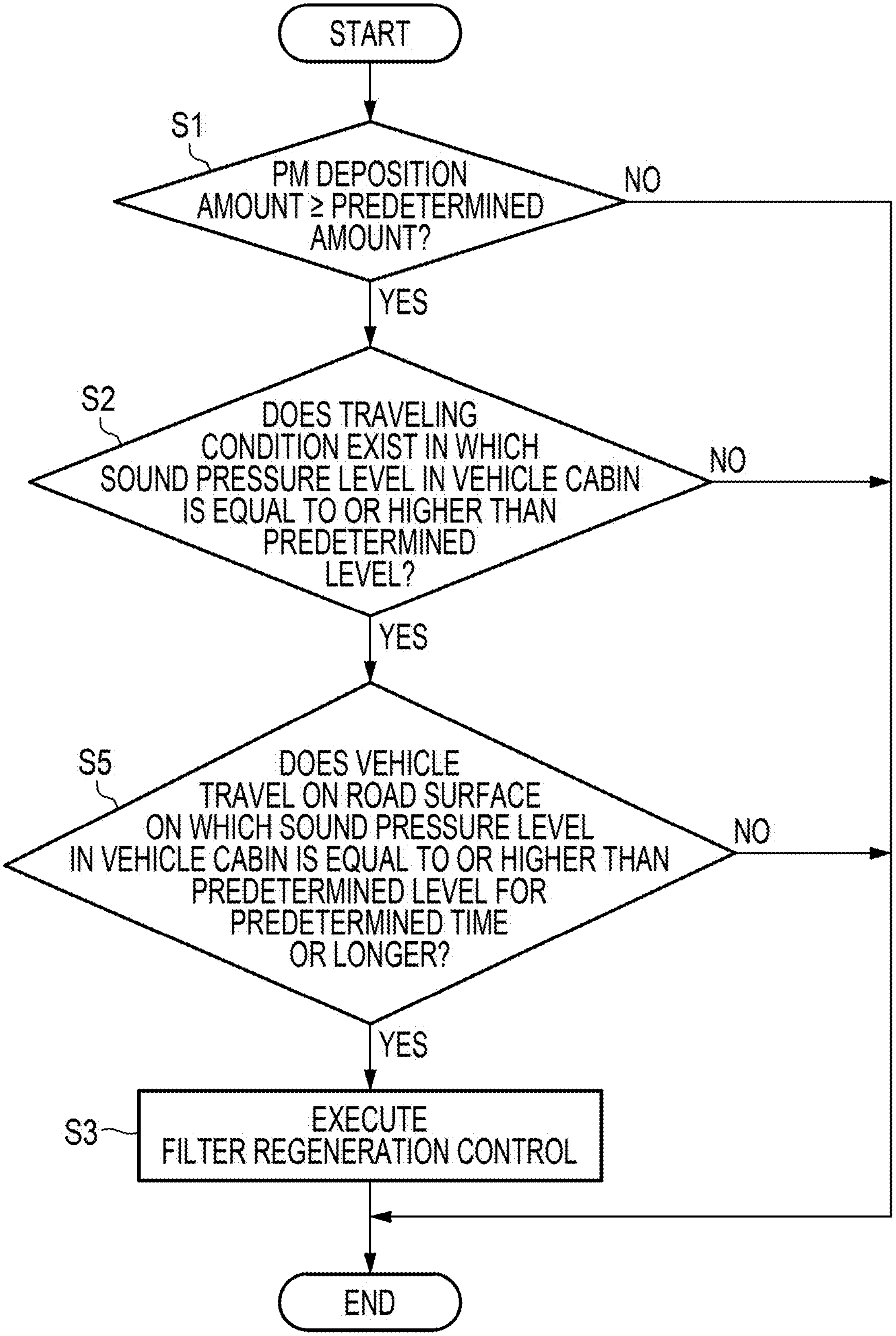
FIG. 5 is a flowchart for describing another control example executed by the filter regeneration control device according to the embodiment of the disclosure.

The flowchart for describing a control example in which the filter regeneration control is configured to be executed in a case where the filter regeneration control is predicted to be completed in a period in which the sound pressure level in the vehicle cabin is equal to or higher than a predetermined level under the traveling condition is shown in FIG. 5. The same reference numerals are given to the same steps as the control example shown in FIG. 3, and the description thereof will be omitted.

In the control example shown in FIG. 5, when the determination in S2 is affirmative, it is determined whether the vehicle travels on the road surface on which the sound pressure level in the vehicle cabin is equal to or higher than the predetermined level for the predetermined time or longer (S5). The determination is made based on the position of the vehicle Ve detected by the GPS receiver 24 and the road surface information stored in the navigation system 21. The predetermined time in the S5 can be set to be longer than the time needed for the filter regeneration control.

In a case where the vehicle travels on the road surface on which the sound pressure level in the vehicle cabin is equal to or higher than the predetermined level for the predetermined time or longer, a positive determination may be made in S5. In this case, since the sound pressure level in the vehicle cabin does not fall below the predetermined level in the process of executing the filter regeneration control, the process proceeds to S3 to execute the filter regeneration control. On the contrary, in a case where a negative determination is made in S5 by not traveling on the road surface on which the sound pressure level in the vehicle cabin is equal to or higher than the predetermined level for the predetermined time or longer, the filter regeneration control is not executed, and the routine is temporarily ended as it is.

The filter regeneration control is executed in a case where the filter regeneration control is predicted to be completed in a period in which the sound pressure level in the vehicle cabin is equal to or higher than a predetermined level under the traveling condition as described above. As a result, it is possible to suppress the sound pressure level in the vehicle cabin from being lower than the predetermined level before the filter regeneration control is completed. As a result, the driver or the occupant can suppress the feeling of discomfort or unpleasantness by recognizing the sound generated by executing the filter regeneration control.

Figure 6:
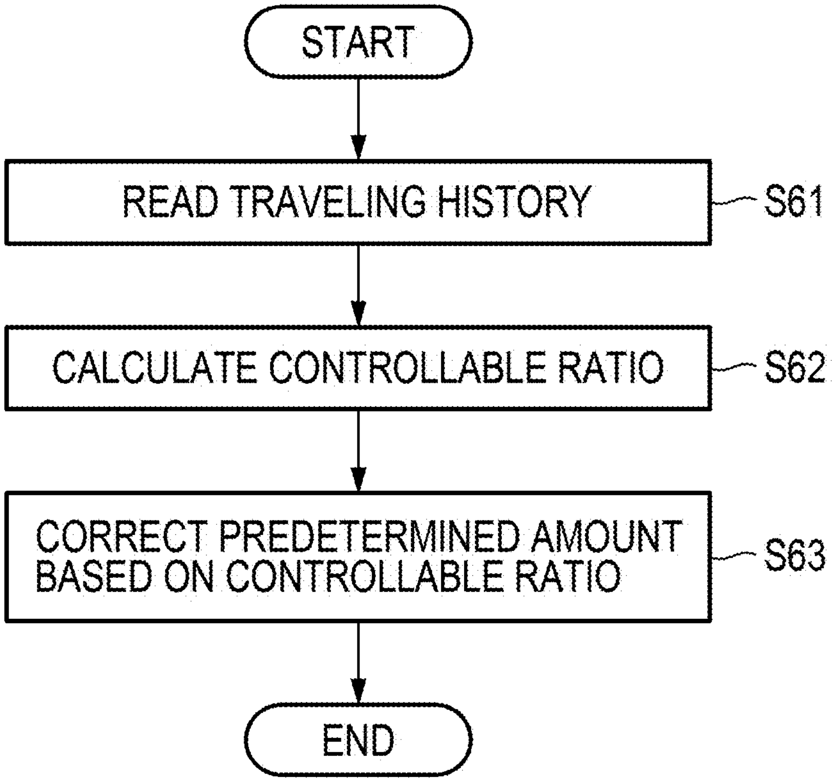
FIG. 6 is a flowchart for describing a control example of correcting a predetermined amount that is a threshold value for determining that the filter regeneration control is executed.

As in the control example shown in FIGS. 3 and 5 described above, the filter regeneration control is executed in a traveling condition in which the sound pressure level in the vehicle cabin is equal to or higher than a predetermined level. Depending on a traveling state, a traveling environment, or a driving manner of a user, an opportunity for executing the filter regeneration control may be restricted. Therefore, the predetermined amount in S1 may be corrected in accordance with the frequency of occurrence of the traveling condition in which the sound pressure level in the vehicle cabin is equal to or higher than the predetermined level by referring to the traveling history. FIG. 6 is a flowchart for describing an example of the control.

In the control example shown in FIG. 6, first, the traveling history of the vehicle Ve is read (S61). The S6 may read the traveling history stored in the storage unit 29, and therefore, reads the total traveling distance and the total traveling time, and the period in which the traveling condition determination unit 27 determines that the traveling condition exists in which the sound pressure level in the vehicle cabin is equal to or higher than a predetermined level.

Next, the controllable ratio is calculated based on the traveling history read in S61 (S62). The S62 is executed by the calculation unit 30. That is, the controllable ratio of a period in which it is determined that the traveling condition exists in which the sound pressure level in the vehicle cabin is equal to or higher than a predetermined level with respect to the total traveling distance or the total traveling time is calculated based on the traveling history read in S62.

Then, the deposition amount (predetermined amount in FIGS. 3 and 5) of the particulate matter that is the threshold value for executing the filter regeneration control is corrected based on the controllable ratio calculated in S62 (S63), and the routine is temporarily terminated. Specifically, the predetermined amount is corrected to a smaller amount as the controllable ratio calculated in S62 is smaller. That is, in a case where the period in which the sound pressure level in the vehicle cabin is relatively small is long, the filter regeneration control is executed less frequently, and thus the filter regeneration control is executable from a time when the amount of the particulate matter deposited in the GPF 13 is small.

As described above, the threshold value for executing the filter regeneration control is corrected according to the controllable ratio. As a result, even in a case where the frequency of occurrence of the traveling condition in which the sound pressure level in the vehicle cabin is equal to or higher than the predetermined level is low, the filter regeneration control can be executed in a limited opportunity. As a result, the filter regeneration control can be suppressed from being executed in a state where the sound pressure level in the vehicle cabin is lower than the predetermined level, and the driver or the occupant can be suppressed from feeling discomfort or unpleasantness.

The vehicle according to the embodiment of the disclosure may include an engine, and the engine is not limited to a gasoline engine and may be a diesel engine. In addition to the engine, the vehicle may be a hybrid electric vehicle including a motor as a drive power source. Further, the filter regeneration control may be executed in a traveling condition in which a sound pressure level in the vehicle cabin is equal to or higher than a predetermined level. For example, the filter regeneration control may be executed in a case where other factors, such as traveling in a noise area, such as a factory area or a daytime urban area, in addition to the traveling condition in which the sound pressure level in the vehicle cabin is equal to or higher than the predetermined level are established.

What is claimed is:

1. A filter regeneration control device for a vehicle that is configured to restore a collecting capability of a filter that collects particulate matter contained in an exhaust gas of an engine, the filter regeneration control device comprising a controller that controls the engine, wherein the controller includes a deposition amount determination unit configured to determine whether a deposition amount of the particulate matter in the filter is equal to or greater than a predetermined amount, a traveling condition determination unit configured to determine, in a case where the deposition amount determination unit determines that the deposition amount of the particulate matter is equal to or greater than the predetermined amount, that a traveling condition exists in which a sound pressure level in a vehicle cabin is equal to or higher than a predetermined level and a regeneration control execution unit configured to execute, in a case where the traveling condition exists in which the sound pressure level is equal to or higher than the predetermined level, filter regeneration control including a warm-up operation of increasing an exhaust temperature of the engine to increase a temperature of the filter and a regeneration operation of supplying oxygen to the filter through the engine.

2. The filter regeneration control device according to claim 1, further comprising a measurer configured to measure the sound pressure level in the vehicle cabin, wherein the traveling condition includes a traveling condition in which the sound pressure level in the vehicle cabin measured by the measurer is equal to or higher than the predetermined level.

3. The filter regeneration control device according to claim 1, wherein the traveling condition includes a traveling condition in which the sound pressure level in the vehicle cabin is estimated to be equal to or higher than the predetermined level.

4. The filter regeneration control device according to claim 1, further comprising a sound generator configured to emit a sound toward the vehicle cabin, wherein the traveling condition includes a traveling condition in which the sound pressure level in the vehicle cabin is equal to or higher than the predetermined level in a case where a signal input to the sound generator is equal to or greater than a predetermined value.

5. The filter regeneration control device according to claim 1, further comprising:

a position specifier configured to specify position information of the vehicle; and a road surface information storage unit configured to store road surface information of a traveling road of the vehicle, wherein the regeneration control execution unit is configured to execute the filter regeneration control in a case where the vehicle travels on a road surface on which the sound pressure level in the vehicle cabin is estimated to be equal to or higher than the predetermined level for a predetermined time or longer, based on the position information specified by the position specifier and the road surface information stored in the road surface information storage unit.

6. The filter regeneration control device according to claim 1, wherein the controller further includes a storage unit configured to store a traveling history of the vehicle, a calculation unit configured to calculate a controllable ratio that is a ratio of a period during which the sound pressure level in the vehicle cabin is equal to or higher than the predetermined level, to a traveling distance of the vehicle or a traveling time of the vehicle, based on the traveling history stored in the storage unit, and a correction unit configured to correct the predetermined amount to a smaller amount as the controllable ratio calculated by the calculation unit becomes smaller.

* * * * *